July 18, 1961

E. J. RABSON 2,992,547

UNIVERSAL JOINTS

Filed May 25, 1959

INVENTOR
EDWARD JOHN RABSON
BY
Irvin S. Thompson
ATTORNEY

United States Patent Office 2,992,547
Patented July 18, 1961

2,992,547
UNIVERSAL JOINTS
Edward John Rabson, Radford Semele, England, assignor to Birfield Engineering Limited, London, England
Filed May 25, 1959, Ser. No. 815,377
Claims priority, application Great Britain June 5, 1958
2 Claims. (Cl. 64—17)

This invention relates to universal joints of the Hooke's coupling type and is concerned with the sealing means employed to prevent escape of lubricant from between the journal pegs of the star member of the joint and the bores in the yoke members in which the journal pegs work.

For the foregoing purpose axial seals have been commonly employed but they suffer from the disadvantage that an adverse accumulation of manufacturing tolerances on the various components of the joint can render this form of seal ineffective. With a view to overcoming the disadvantage lipped seals which act radially of the journal pegs have been proposed, but there is insufficient space available to house this type of seal in the smaller sizes of joint and it is just these smaller sizes which are made in the largest quantities and in which the need to maintain lubricant on the parts for considerable periods of time without attention is greatest.

The main object of the present invention is to overcome the disadvantages of the known arrangements and to provide improved sealing means for the foregoing purpose which will result in a universal joint capable of functioning for very considerable periods without further lubrication.

According to the invention a universal joint of the Hooke's coupling type is provided wherein sealing means provided between each journal peg of the star member and the bore in the yoke member in which it works comprise an O ring seal seated in an annular groove by which it is located in its axial direction and bearing on a machined part of the star member at the root of the journal peg.

The annular groove is preferably formed in the bore and the machined part of the star member is of larger diameter than said journal peg, the arrangement being such that the O ring projects from the groove and bears on said larger diameter part of the star member. Preferably one or other of the cylindrical surfaces against which the O ring bears, i.e. the groove in the bore or said larger diameter part of the star member, is fine-machined or ground.

Figure 1:
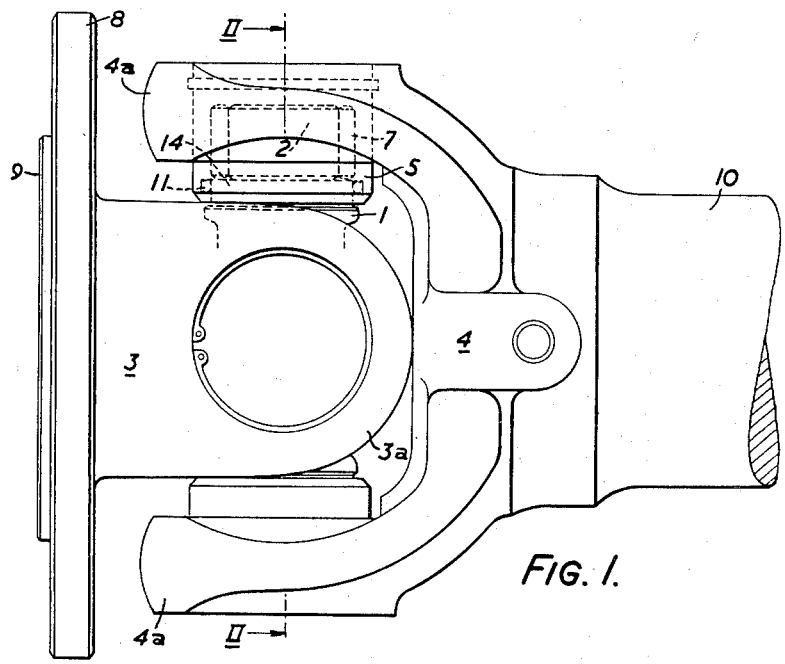
Figure 2:
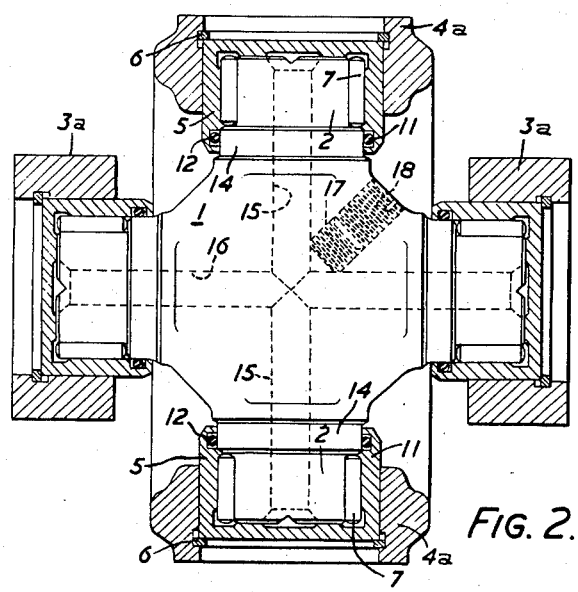

The invention will now be further described with reference to the accompanying drawings which illustrate, by way of example, a universal joint in accordance with the invention, and in which:

FIGURE 1 is a side view of the joint, and
FIGURE 2 is a cross-sectional view on the line II—II in FIGURE 1.

As in the usual production form of universal joint of the Hooke's coupling type the illustrated joint has a star member 1 formed with cylindrical journal pegs such as 2 arranged in diametrically opposed pairs with their longitudinal axes coplanar. The axes of the two pairs of journal pegs 2 intersect at right angles. Yoke members 3 and 4 each have two opposed jaws 3a and 4a, the two jaws of each yoke member having aligned open-ended bores. The journal pegs 2 work in bores in separate bearing bushes or thimbles such as 5 closed at one end and held in open-ended bores in the jaws 3a and 4a of the yoke members 3 and 4 by means of circlips such as 6. The joint is of the needle bearing type, a ring of needle rollers such as 7 being interposed between each journal peg 2 and the corresponding bush 5.

The yoke member 3 is formed integrally with a flange 8 and spigot 9 for attachment to and centralisation on a driving or driven member, for example a gearbox output member, and the yoke member 4 is welded to a drive transmitting shaft 10.

Sealing means between each journal peg 2 and the bore of the corresponding bush 5 comprise an O ring seal such as 11 seated in an annular groove 12 formed in the inner surface of the bush at a point nearer the open inner end of the latter than the adjacent ends of the corresponding needles 7. The O ring 11 bears on a machined part 14 of the star member 1 formed at the root of the corresponding journal peg 2, this part 14 being of larger diameter than the journal peg 2 itself. As a result, a pronounced shoulder is formed adjacent the root end of the journal peg which provides an end location for the corresponding needle rollers 7 and prevents them moving endwise and damaging the O ring 11 under operation of the joint.

It will be appreciated that, apart from the other advantages resulting from the invention, the larger diameter parts 14 at the root ends of the journal pegs 2 of the star member 1 have the effect of strengthening such member at a vital point.

The journal pegs 2 are bored through axially at 15 and 16, these bores being joined, at their point of intersection, by a further bore 17 which terminates at the outer surface of the member 1 midway between two journal pegs 2 of the latter. Prior to assembly of the joint the bushes 5 are packed with a quantity of lubricant more than sufficient to fill the available space in the bushes 5 and the bores 15 and 16 after the joint is assembled. On assembly the lubricant is displaced to fill the bores 15 and 16 and the excess ejected from the bore 17. A grub screw 18 is then introduced to seal the bore 17 and, as the efficiency of the O ring seals is such that further lubrication should not normally be required during the life of the joint, the screw 18 is peened over to lock it in position in the bore 17.

It will also be appreciated that the invention is also applicable to joints utilising plain bearings for the journal pegs of the star member, instead of the needle rollers 7, though such an arrangement is not illustrated.

I claim:

1. A universal joint assembly comprising a pair of opposed yoke members each having two jaws defining journal bores closed at their outer ends and open at their inner ends, needle roller bearings housed in said bores, an intermediate star member formed with journal pegs which are rotatable in said needle roller bearings, a cylindrical machined part at the inner or root end of each journal peg and of greater diameter than the peg to provide a shoulder having a radial face and a machined circumferential face, each bore having an annular groove therein adjacent its inner end, each groove being formed by inner and outer radial faces and by a machined circumferential face, the open side of each groove being substantially closed by the circumferential face of one of said shoulders, and a resilient O ring seal in each groove bearing with radial sealing forces against the circumferential faces both of the groove and of the shoulder which closes the groove, and wherein the radial faces of the shoulders provide end location for the needle rollers to prevent them contacting the O rings.

2. An assembly according to claim 1, wherein the journal bores are provided in bearing thimbles mounted in open-ended bores in said yoke members.

References Cited in the file of this patent

UNITED STATES PATENTS

| | | |
|---|---|---|
| 1,767,551 | Peters | June 24, 1930 |
| 2,285,623 | Swenson et al. | June 9, 1942 |
| 2,629,992 | Anderson | Mar. 3, 1953 |
| 2,915,344 | Zeller | Dec. 1, 1959 |

FOREIGN PATENTS

| | | |
|---|---|---|
| 338,968 | Great Britain | Dec. 1, 1930 |